(12) United States Patent
Giunta et al.

(10) Patent No.: US 10,401,254 B2
(45) Date of Patent: Sep. 3, 2019

(54) METHOD AND SYSTEM FOR CONTINUOUS REMOTE MONITORING OF THE INTEGRITY OF PRESSURIZED PIPELINES AND PROPERTIES OF THE FLUIDS TRANSPORTED

(71) Applicant: ENI S.p.A., Rome (IT)

(72) Inventors: Giuseppe Giunta, San Donato Milanese (IT); Giancarlo Bernasconi, Malnate (IT)

(73) Assignee: ENI S.p.A., Rome (IT)

(*) Notice: Subject to any disclaimer, the term of this patent is extended or adjusted under 35 U.S.C. 154(b) by 645 days.

(21) Appl. No.: 14/442,808

(22) PCT Filed: Dec. 18, 2013

(86) PCT No.: PCT/EP2013/077116
§ 371 (c)(1),
(2) Date: May 14, 2015

(87) PCT Pub. No.: WO2014/096019
PCT Pub. Date: Jun. 26, 2014

(65) Prior Publication Data
US 2015/0300907 A1  Oct. 22, 2015

(30) Foreign Application Priority Data
Dec. 20, 2012 (IT) .............................. MI2012A2197

(51) Int. Cl.
*G01M 3/24* (2006.01)
*G01H 1/00* (2006.01)
(52) U.S. Cl.
CPC .............. *G01M 3/243* (2013.01); *G01H 1/00* (2013.01)
(58) Field of Classification Search
None
See application file for complete search history.

(56) References Cited

U.S. PATENT DOCUMENTS 3,881,353 A * 5/1975 Fathauer ................ A01C 7/105
                                                    111/903
4,067,015 A * 1/1978 Mogavero ................ G01S 3/48
                                                    318/560

(Continued)

FOREIGN PATENT DOCUMENTS

DE       37 26 585 A1    2/1989
DE     195 28 287 A1    2/1997

(Continued)

OTHER PUBLICATIONS

International Search Report dated Feb. 7, 2014 in PCT/EP2013/077116.

(Continued)

*Primary Examiner* — Alexander Satanovsky
*Assistant Examiner* — Lina M Cordero
(74) *Attorney, Agent, or Firm* — Oblon, McClelland, Maier & Neustadt, L.L.P.

(57) ABSTRACT

A method and system for continuous remote monitoring of integrity of pressurized pipelines and properties of fluids transported, the method including: installing plural measurement stations along the pipeline, connected to vibroacoustic sensors configured to simultaneously and continuously measure elastic signals propagating in walls of the pipeline, and acoustic signals propagating in the transported fluid; synchronizing the signals measured from different measurement stations, with absolute time reference; continuously transmitting the measured and synchronized signals to a central unit configured to process them in a multichannel mode; calculating, by the central unit, plural transfer functions that can define vibroacoustic propagation in sections of pipeline between consecutive measurement stations; filtering relevant acoustic and elastic signals from the different measurement stations subtracting the contribution relating to the passive sources; creating an equivalent descriptive model of (Continued)

the system including the fluid transported, pipeline and external medium surrounding the pipeline, using the transfer functions.

12 Claims, 4 Drawing Sheets

(56) References Cited

U.S. PATENT DOCUMENTS

| | | | | |
|---|---|---|---|---|
| 4,201,092 A * | 5/1980 | Dau | G01M 3/243 | 376/250 |
| 4,901,575 A * | 2/1990 | Bohannan | G01H 1/00 | 73/587 |
| 4,956,999 A * | 9/1990 | Bohannan | G01H 1/00 | 73/587 |
| 5,038,614 A * | 8/1991 | Bseisu | G01M 3/243 | 376/252 |
| 5,058,419 A * | 10/1991 | Nordstrom | G01M 3/24 | 367/125 |
| 5,251,186 A * | 10/1993 | Lockwood | G01S 15/104 | 367/100 |
| 5,987,990 A * | 11/1999 | Worthington | G01N 29/14 | 73/40.5 A |
| 6,082,193 A * | 7/2000 | Paulson | G01M 3/243 | 73/152.58 |
| 6,267,000 B1 * | 7/2001 | Harper | G01M 3/24 | 73/40 |
| 6,453,247 B1 * | 9/2002 | Hunaidi | G01M 3/243 | 702/51 |
| 6,820,016 B2 * | 11/2004 | Brown | G01M 3/243 | 702/36 |
| 7,009,912 B1 * | 3/2006 | Haley | G01S 3/8083 | 342/21 |
| 7,421,932 B1 * | 9/2008 | Heinzmann | B23D 59/001 | 83/370 |
| 7,607,351 B2 * | 10/2009 | Allison | F16L 55/00 | 702/36 |
| 8,620,602 B2 * | 12/2013 | Alonso | F17D 5/06 | 702/52 |
| 9,612,189 B2 * | 4/2017 | Hansen | G01H 9/004 | |
| 2009/0000381 A1 * | 1/2009 | Allison | F16L 55/00 | 73/596 |
| 2009/0122641 A1 * | 5/2009 | Hillesund | G01V 1/3808 | 367/20 |
| 2010/0091610 A1 * | 4/2010 | Sollner | G01V 1/38 | 367/24 |
| 2010/0124148 A1 * | 5/2010 | Kluver | G01V 1/36 | 367/24 |
| 2010/0124149 A1 * | 5/2010 | Barr, Jr. | G01V 1/3808 | 367/24 |
| 2010/0275675 A1 * | 11/2010 | Seppa | G01L 9/0041 | 73/24.01 |
| 2011/0093220 A1 * | 4/2011 | Yang | G01M 3/243 | 702/51 |
| 2012/0007744 A1 | 1/2012 | Pal et al. | | |
| 2014/0121999 A1 * | 5/2014 | Bracken | G01M 3/243 | 702/51 |
| 2014/0165731 A1 * | 6/2014 | Linford | G01M 3/243 | 73/592 |

FOREIGN PATENT DOCUMENTS

| | | |
|---|---|---|
| KR | 10-2011-0032272 | 3/2011 |
| WO | WO 2011/021039 A1 | 2/2011 |

OTHER PUBLICATIONS

Korean Office Action and Search Report issued in Patent Application No. UAE/P/699/2015 dated Jun. 30, 2019, citing reference AO therein (English translation).

* cited by examiner

METHOD AND SYSTEM FOR CONTINUOUS REMOTE MONITORING OF THE INTEGRITY OF PRESSURIZED PIPELINES AND PROPERTIES OF THE FLUIDS TRANSPORTED

The present invention concerns a method and a system for the continuous remote monitoring of the integrity of pressurized pipelines and properties of the fluids transported, such as natural gas, crude oil, water, petroliferous products, etc., preferably able to be used with long-distance gas pipelines and oil pipelines.

In particular the method, according to the present invention, foresees the installation of a monitoring system equipped with measurement stations of the vibroacoustic signals, positioned up to tens of kilometers apart along the pipeline, and with a control unit suitable for processing the signals received from the stations for the continuous remote identification and localization of anomalous events of the flow (leaks, withdrawals, deposits, geometric deformations, variations in the fluid, etc.), third party interferences (TPI) with the pipeline (impacts, intrusions, maneuvering on the valves, etc.) and variations of the properties of the fluid transported (density, viscosity, speed of sound, attenuation, etc.).

Each vibroacoustic/fluid-dynamic phenomenon, for example impact, intrusion, leak, withdrawal, maneuvering on the flow regulation systems, which reaches or which is carried out along a pressurized pipeline for fluid transportation, generates elastic waves on the wall of the pipeline and acoustic waves in the transported fluid. These waves propagate along the pipeline even over long distances, according to laws that depend on the shape of the signal (frequency band, amplitude), on the thermodynamic properties of the fluid, on the elastic properties and geometric characteristics of the pipeline and on the external medium.

Moreover, each variation of the same geometric characteristics, elastic properties of the pipeline and of the external medium, and thermodynamic properties of the fluid generates a variation in the transfer function that describes the propagation of the vibroacoustic waves along the pipeline.

Various patents exploit the acoustic monitoring of pipes. For example, patents WO2011127546, U.S. Pat. Nos. 5,416,724, 6,668,619, use this methodology for detecting leaks in pipelines, whereas U.S. Pat. No. 7,607,351 uses it to detect impacts, and document U.S. Pat. No. 6,138,512 uses it to detect generic acoustic sources.

These techniques measure, in at least two points, at both sides of the source, the acoustic waves that propagate in the two directions, and use correlation procedures, pattern matching, back-propagation, or analysis with neural networks, to identify and localize the anomalous event.

In particular, patent WO2011127546 integrates measurements of acoustic signals and of mass balance, suitably calibrating the fluid-dynamics equations with temperature, flow rate, pressure and density measurements along the pipeline.

Moreover, document WO2009129959, proposes the localization of acoustic emissions in pipelines, by means of multi-channel measurements in a single point, exploiting the speed difference of the vibrational waves that propagate along the wall of the pipeline and the acoustic waves in the fluid inside the pipeline.

As far as the estimation of the properties of the fluid is concerned, U.S. Pat. Nos. 5,285,675 and 7,503,227 propose the use of at least two sensors spaced apart along the longitudinal coordinate of the pipeline to obtain the propagation speed of the acoustic waves and, through suitable constituent relations, also integrated with temperature measurements, obtain other parameters of the fluid or of the mixture.

The vibroacoustic monitoring techniques of pipelines that are known in the state of the art measure and process the signals collected by many sensors arranged along the pipeline.

In particular, the variations of the propagation parameters that describe the transfer function (speed of sound and attenuation) of the acoustic waves, due for example to variations in flow, pressure, temperature, type of product, geometry of the pipeline, are not always estimated and compensated continuously, causing uncertainty in the identification and localization of the anomalous events.

Moreover, in known techniques, the logistic difficulties in the data transmission lead to the choice of transmitting to the central processing unit only a subset of the data recorded by the remote stations, for example amplitude peaks, or more energetic sub-bands, actually preventing multi-channel processing from being carried out on the complete raw data.

The aforementioned known techniques do not consider the passive acoustic signals produced by working operations of the pipeline that are generated close to the compression/pumping systems, and/or to flow-regulation devices in the pipeline. These phenomena degrade the power ratio between the signal due to anomalous events and the signal due to the noise generated by the standard pipeline operations.

Finally, known techniques do not completely integrate the geometric variables of the pipeline (sections, lengths, deformations), the properties of the fluid transported (density, temperature, type, viscosity, etc.), and the elastic properties of the external medium to the pipe (soil, air, water) in the fluid-dynamic model of the pipeline.

The purpose of the present invention is to avoid the aforementioned drawbacks and, in particular, to provide a method and a system for continuous remote monitoring of the integrity and of the properties of the fluids that does not interfere with the working operations of the pipeline.

A further purpose of the present invention is to obtain the propagation parameters of the vibroacoustic waves in the various sections of pipeline.

A further purpose of the present invention is to continuously remotely identify and localize the active sources along a pipeline due to anomalous events $S_i(f)$, including flow anomalies (leaks, withdrawals, deposits, geometric deformations, variations in the fluid, etc.), interference of third parties (impacts, intrusions, maneuvering on the valves, etc.) and the variations in the properties of the fluid transported (density, viscosity, speed of sound, attenuation, etc.).

The last but not least purpose of the present invention is to identify possible geometric variations in the pipeline, such as obstructions or deformations, and/or variations in the thermodynamic properties of the fluid.

These and other purposes according to the present invention are accomplished by making a method and system for the continuous remote monitoring of the integrity of a pressurized pipeline and properties of the fluids transported as outlined in the claims.

Further characteristics of the method and system for continuously monitoring the integrity of a pressurized pipeline and properties of the fluids transported are the object of the dependent claims.

Advantageously, the method, according to the present invention, makes it possible to define a mathematical model representing the pipeline and consequently to have a tool for analysing and monitoring the pipeline integrity and the properties of the fluids transported in it.

The method also makes use of numerical simulators of the vibroacoustic response of equivalent models of the pipeline in order to simulate the behaviour of the pipeline for certain vibroacoustic events that are unknown a priori, providing the possibility of interpreting and identifying them.

The comparison of the real vibroacoustic data with the data obtained from the mathematical model, suitable for simulating the working pipeline, makes it possible to highlight discrepancies that are representative of possible anomalous events.

The method can foresee the further phase of using training techniques, based on neural networks and/or genetic algorithms, to select the best transfer function capable of representing said section of pipeline.

The temporal evolution of the transfer functions is analysed to invert the geometric characteristics of the pipeline and/or the properties of the fluid transported.

Moreover, the single signals recorded by the stations can be processed with threshold criteria and with recognition techniques based on the comparison of the waveforms in order to identify, localize and classify anomalous impulsive events.

Advantageously, this phase makes it possible to identify and localize, in real time, events that are not common, such as impacts, intrusions, leaks or withdrawals.

Furthermore, the vibroacoustic signals generated by a passive source (T), for example, compressor/pump and/or flow regulation system, can be discriminated from the vibroacoustic signals coming from other locations along the pipeline, by using direction of propagation and/or delay criteria on the signal recorded at two consecutive measurement stations positioned close to the passive source. In order to permit a correct estimation of the signal produced by the passive sources, the distance between these two stations has to be preferably greater than half a wavelength of the minimum frequency generated by the mentioned passive source. Said specific distance makes it possible to maximise the discrimination and localization effect of the active sources with respect to the passive ones. Preferably, said measurement stations are positioned on the same side with respect to said passive source (T).

Advantageously, this phase makes it possible to eliminate the noise generated by the passive sources (T) from the signal recorded by the measurement stations, increasing the signal to noise ratio.

Each vibroacoustic phenomenon that reaches or that is generated along a pipeline for transporting fluids produces both elastic waves on the wall of the pipeline and acoustic waves in the transported fluid. These waves propagate along the pipeline even over great distances and they sum up to the vibroacoustic waves generated by flow variations due to standard pipeline operation.

In particular, according to the present invention, with the term vibroacoustic signal we mean both the signals of said acoustic waves and elastic waves.

The acoustic propagation in the fluid is described mainly by the attenuation coefficient and by the propagation speed of the waves. In turn, these parameters are a function of the frequency, of the thermodynamic properties of the fluid, of the geometric characteristics and elastic properties of the pipe and of the external medium. Attenuation and propagation speed can also vary during standard operating conditions of a pipeline, for example due to a variation in the composition of the fluid, to the formation of a deposit or to a geometric deformation of the pipeline.

Physical-mathematical theory states that the vibroacoustic propagation in a pipeline is governed by its geometric characteristics, by the elastic and thermodynamic properties of the fluid/pipeline/external medium system, and that any variation of these produces reflected and transmitted waves that in turn propagate from the point of origin of the variation or anomaly.

In general, the following can be considered examples of active sources of vibroacoustic signals:
impacts, intrusions, withdrawals, leaks;
variation of the flow or turbulence,
the transit of a pig (pipeline inspection gauge) inside the pipeline.

Meanwhile, among the variations of the geometric/physical characteristics of the pipeline and of the fluid transported, there are:
variations in diameter;
variations in material;
local deformations of the pipeline;
partial blockages;
partial closures of valves;
type of fluid;
variations in temperature and pressure.

The vibroacoustic signals that propagate along the pipeline contain information on the source that generated them and on the transmission channel through which they propagate. The installation of vibroacoustic sensors, for example pressure, velocity and acceleration transducers, along the pipeline allows these signals to be recorded, even at great distances from their point of origin.

In particular, it is possible to use vibroacoustic sensors of the hydrophone and/or geophone and/or accelerometer type.

The signals measured by said measurement stations can then be synchronised by processing units (local and central), for example through the use of Global Positioning System (GPS) devices, and suitable for carrying out multi-channel processing of said signals.

The recording of vibroacoustic signals (RTTM: Real Time Transient Measurements) along the pipeline, in one or more points, and their processing in the central unit, makes it possible to continuously calculate the parameters that describe the transfer functions of the sections of pipeline between consecutive measurement stations, and to identify anomalous variations of the signals and/or of the same transfer functions, able to be associated, through suitable inversion and recognition techniques, to anomalous events that can put at risk the integrity and the correct operation of the pipeline.

The method according to the present invention advantageously exploits in an integrated manner the mathematical link between of vibroacoustic phenomena and the physical characteristics of the pipeline, to obtain information on the events that, continuously, involve the pipeline.

The present method is based on the fact that:
each interaction with a pipeline for fluids transportation causes acoustic signals in the fluid and elastic signals on the pipe shell;
the vibroacoustic signals caused by medium low-frequency interaction events (less than 500 Hz), like for example the intrusion of third parties, or the transit of a pig that crosses the welds of the pipeline, and/or the repair operations of a pipeline, propagate in the fluid transported even for many tens of km in distance;
the low frequency acoustic signals (less than 10 Hz), produced for example by spill or leaks of liquid and gaseous phase form a high pressure conduit (30-200 bar), or by flow regulation operations along the pipeline, propagate in the fluid even for hundreds of km.

the standard working operations on the pipeline in the terminal stations, and, in particular, the variations in flow and pressure generated by the compressor/pump and/or flow regulation systems, are a continuous source of acoustic signals of passive type;

the points of turbulence along the pipeline are secondary active sources of an acoustic signal that is regulated by the fluctuations of the flow of the fluid transported;

the points of variation of the elastic properties and geometric characteristics of the pipeline and of the fluid produce reverberations in both directions of propagation.

The characteristics and advantages of the method for continuous remote monitoring of the integrity of pipelines and properties of the fluids transported according to the present invention will become clearer from the following description, given as an example and not for limiting purposes, referring to the attached schematic drawings, in which:

FIG. 4 also illustrates the relative pressure diagrams, original and filtered, detected at two measurement stations positioned along the pipeline;

Figure 1:
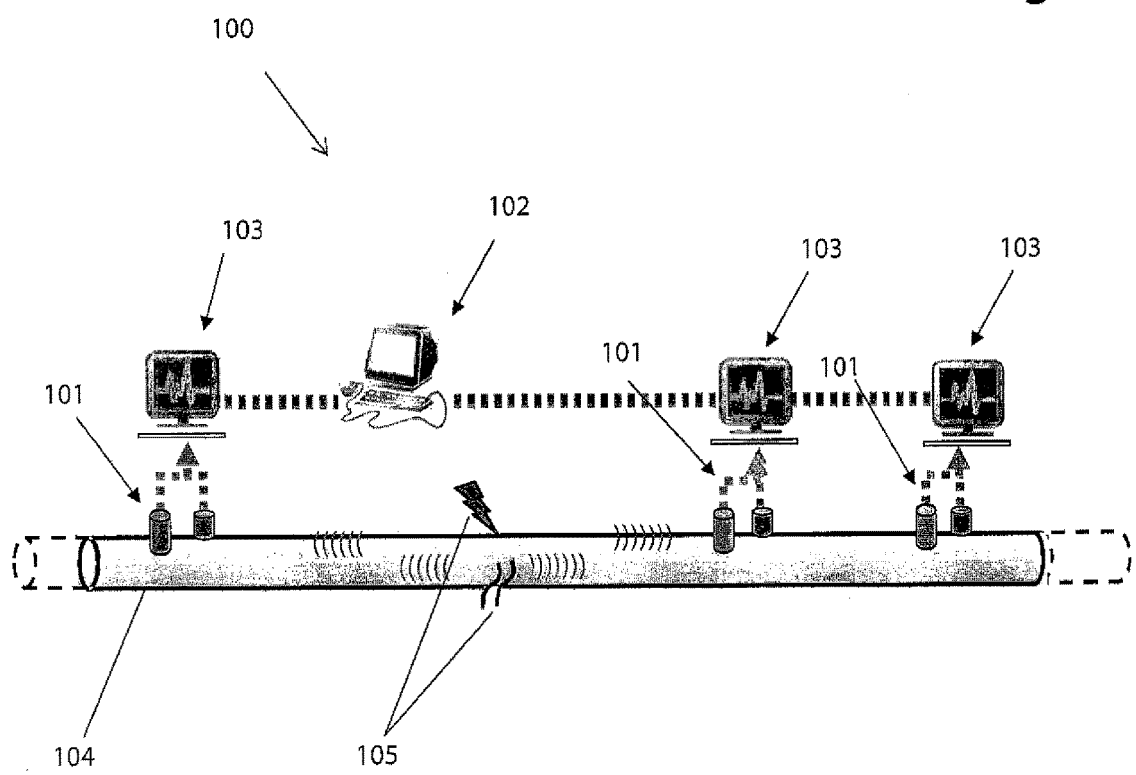
FIG. 1 shows a schematic view of the continuous remote monitoring system.

With reference to FIG. 1, a continuous remote monitoring system is shown, generically indicated with 100, comprising a plurality of measurement stations 103, each comprising a group of vibroacoustic sensors 101 positioned in contact with the pipeline 104 and with the fluid transported, positioned along a pipeline 104 and connected to a central processing unit 102.

Each measurement station 103 also comprises a local multichannel processing unit suitable for acquiring, pre-processing and locally saving the measurements.

In particular, the measurement stations 103 are arranged along the pipeline 104 and they continuously measure the elastic waves that propagate along the walls of the pipeline and the acoustic waves, i.e. variations in pressure, that propagate in the fluid and that are generated by an anomalous event 105, for example an impact or a leak and/or the transit of a pig inside the pipeline 104.

Each measurement station 103 comprises a Global Positioning System (GPS) device for synchronization in real time with the other measurement stations 103, a conditioning system of the sensors, a power unit and a data transmission block (radio, microwave, optical fibre, GPRS or G3 telephone type), with the central processing unit 102.

The method for the continuous remote monitoring of the integrity of a pressurized pipeline 104 and properties of the fluids transported, such as natural gas, crude oil, water, petroliferous products, etc., preferably able to be used with long-distance gas pipelines and oil pipelines, comprises the following phases:

installing, along the pipeline, a plurality of measurement stations 103 connected to vibroacoustic sensors 101 suitable for simultaneously and continuously measuring elastic signals propagating in the walls of the pipeline, and acoustic signals propagating in said transported fluid synchronising said signals x(t), with absolute time reference (eg. Global Positioning System), measured from said different measurement stations 103;

continuously transmitting said measured and synchronized signals x(t) to a central unit 102 suitable for processing them in a multichannel mode;

calculating, through said central unit 102, a plurality of transfer functions H(f) suitable for defining the vibroacoustic propagation in sections of pipeline 104 between consecutive measurement stations 103 using, as analysis signals, said measured and synchronized signals x(t) and the relative Fourier transforms X(f);

continuously updating said transfer functions H(f) using acoustic and elastic signals generated by passive sources (T) present in the pipeline 104, preferably selected from pumps, compressors and/or flow-regulation devices;

filtering the acoustic and elastic signals detected by the different measurement stations (103), subtracting the contribution relating to the passive sources (T), allowing the signal/noise ratio to be increased and allowing the anomalous events $S_i(f)$ to be identified more clearly.

making an equivalent descriptive model of the system comprising the fluid transported, pipeline and external medium surrounding the pipeline itself, using said transfer functions H(f) connected with each other.

In order to measure the elastic signals and the acoustic signals it is possible to use multi-sensors (101), preferably hydrophones and/or geophones and/or accelerometers.

Preferably, the vibroacoustic signals measured by said measurement stations 103 are continuously synchronised (for example through a GPS device) and sent to the central unit 102, suitable for carrying out multi-channel processing of said signals and calculating the transfer function of the single sections of pipeline 104.

Once an equivalent mathematical model of the pipeline 104 has been made, it is possible to validate it through further phases of the method.

In particular, the equivalent model thus defined can be corrected and updated through the continuous processing of the vibroacoustic measurements detected by the various measurement stations 103.

In order to identify the equivalent model most representative of the pipeline 104 it is possible to use training techniques based on neural networks and/or genetic algorithms that are calibrated according to predefined rules.

In order to better constrain and to speed up the processing of the equivalent model, it is possible to set a priori some known variables of the fluid/pipeline/external medium system, like for example the amplitude and the frequency of the vibroacoustic signals, or the propagation constants of the acoustic waves in the pipeline 104, i.e. attenuation, dispersion and speed of sound. By inverting the geometric characteristics of the pipeline and/or the properties of the fluid transported through said transfer function it is possible to identify the variations with respect to the vibroacoustic measurements detected by the measurement stations 103.

Possible significant variations in the real values measured by the measurement stations 103 with respect to the values calculated through the equivalent model, and in particular variations greater than a threshold defined as a function of the noise level generated by the passive sources, are processed with pattern matching techniques, for example based on the comparison with reference wave forms and/or threshold criteria, to localize and classify the anomalous event. For example, a variation of the amplitude of the acoustic signal in the fluid transported in the pipeline 104 can indicate a leak phenomenon, whereas a variation in the attenuation of the acoustic waves in the pipeline 104 can for example indicate a physical deformation or a deposit in the pipeline 104.

In particular, the analysis of the parameter variations and therefore of the anomalies is carried out both with respect to the amplitude and to the frequency of the vibroacoustic signals, and with respect to the propagation constants of the vibroacoustic waves in the pipeline 104, i.e. attenuation and speed of sound.

In order to make the model more sensitive to external anomalies, two measurement stations 103 are positioned at a suitable distance from each other and close to each passive source (T), for example a pump, a compressor and/or a flow regulation device, in order to measure the background noise generated by the same passive source.

The delay detected at the two measurement stations 103, relative to the various signals generated by the passive source (T), makes it possible to determine the direction of propagation of the vibroacoustic signal generated by the same passive source.

Knowing the direction of the signal of the passive source (T) it is possible to discriminate it from the vibroacoustic signals that propagate in the opposite direction.

This effect occurs mainly when the two measurement stations 103 are positioned close to the passive source (T), at a reciprocal distance preferably greater than half a wavelength of the minimum frequency generated by the mentioned passive source and in a point sufficiently unaffected from possible intermediate vibroacoustic phenomena between the two stations 103.

In this way it is possible to filter the vibroacoustic signal detected by the different measurement stations 103, subtracting the contribution relative to the passive sources (T) from it. This allows the signal/noise ratio to be increased and anomalous events to be identified more clearly.

It is also possible to carry out ad hoc maneuvers on the flow and/or to generate traceable acoustic signals with dedicated active sources, such as turbines, sirens, or controlled impacts, to check and/or updates the response of the equivalent defined model.

With reference to the structure of the continuous monitoring system 100 of the integrity of the pipeline 104, each measurement station 103 can carry out the following operations:
  local filtering and saving of the data acquired by the vibroacoustic sensors 101;
  synchronization of the data acquired by the vibroacoustic sensors 101, with the one collected by the other measurement stations 103;
  transmission of the vibroacoustic data to the central processing unit 102;
  statistical analysis of the data for pre-identification of the anomalous events;
  functional diagnostic of the station.

The central processing unit 102 has the ability to calculate and save data received, and it carries out the following operations:
  collection of the vibroacoustic data processed by the measurement stations 103;
  continuous analysis of the acoustic signals generated by the compression/pumping and/or flow regulation systems, and acquired from pairs of measurement stations 103 arranged at suitable distance close to these systems, performing discrimination of the signals as a function of the direction of propagation, based on the analysis of the delay times at the two measurement stations 103;
  continuous calculation and updating of the vibroacoustic transfer functions H(f) between pairs of measurement stations 103, using, as analysis signal, the acoustic signals generated by the compression/pumping and/or flow regulations systems;
  continuous calculation of the vibroacoustic propagation parameters in the pipeline 104 between the measurement stations 101, such as attenuation and speed of sound;
  continuous subtraction of the acoustic signals generated by the compression/pumping and/or flow regulations systems, from the signals acquired by the pairs of measurement stations 103 positioned close to the passive sources (T), suitably corrected for the transfer functions H(f) calculated between the sections of pipeline positioned between the passive source (T) under examination and the measurement station 103;
  analysis and identification of short-period anomalies 105, i.e. of the order of a second/minute, in the vibroacoustic signals of the measurement stations 101, after the removal of the signals produced by the passive sources (T);
  geographical localization of the source point of the anomalies 105 along the pipeline 102 and generation of an encoded alarm message;
  long-period calculation and inversion, i.e. of the order of hours/days, of the geometric characteristics of the pipeline 104 and/or of the properties of the fluid transported in order to identify slow changes in the fluid/pipeline/external medium system, for example associated with local variation in the internal section of the pipe (mechanical deformation, indentations, partial blockage, deposits, etc.);
  functional diagnostic of the central unit.

The identification of anomalies 105 can be carried out with threshold criteria and/or with comparison techniques with known wave forms.

In order to continuously identify an anomaly 105 the equivalent propagation model of the vibroacoustic signals in the pipeline 104 is calculated, determined by calibrating the acoustic propagation parameters, for example speed of sound, attenuation coefficient, etc., obtained experimentally from the measurements of the passive sources (T).

In order to localize the source point of an anomaly 105 along the pipeline 104, the back-propagation function of the vibroacoustic signals of the anomalous event towards all of the sections of pipeline between the different consecutive measurement stations 103 is used. The central processing unit 102 comprises suitable software and a graphical interface for the configuration and calibration of the processing parameters, displaying of the localization results of the anomalous event 105 with alarm initiation, remote configuration of the measurement stations 103, management of the alarm procedures and functional diagnostics.

The present method experimentally calculate the acoustic transfer function H(f) between pairs of measurement stations 103, comprising, in addition to the acoustic propagation terms, also the possible reverberations inside the section of pipeline under examination, due for example to variations in diameter of the pipeline.

Figure 2:
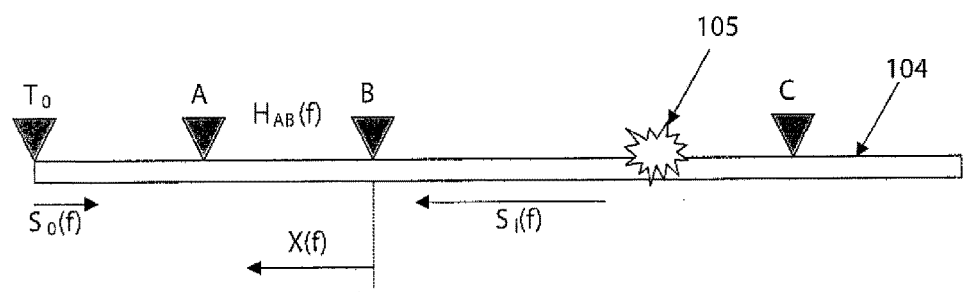
FIG. 2 shows a schematic view of the pipeline in which some measurement stations are installed and in which a generic acoustic signal and other signals relative to anomalous events propagate.

With reference to FIG. 2, $S_0(f)$ indicates the Fourier transform of the signal $s_0(t)$ generated by the generic compression/pumping system $T_0$ that propagates in the pipeline 104.

The pipeline 104 can be schematised as a transmission channel representative of the pipeline itself.

Said transmission channel represents the mathematical schematisation of the system consisting of fluid transported, pipeline and external medium surrounding the pipe.

$H_{AB}(f)$ represents the acoustic response to the impulse (time variant) of the acoustic channel between points A and B.

The monitoring system continuously calculates the acoustic responses of all the sections of the pipeline defined between pairs of measurement stations A-B and B-C, using the adaptive filtering theory, for example through a Widrow-Hoff algorithm.

Considering the sampled acoustic signals x(n) recorded by a measurement stations, and indicating with n the n-th sample, the Widrow-Hoff algorithm estimates at each instant the coefficients $\hat{h}_{AB}(n)$ of a filter of order N, which describes the time variant response of the transmission channel between points A and B, in the following way:

$$x_A(n)=[x_A(n), x_A(n-1), \ldots, x_A(n-N+1)]^T$$

$$e(n)=x_B(n)-\hat{h}_{AB}^T(n)x_A(n)$$

$$\hat{h}_{AB}(n+1)=\hat{h}_{AB}(n)+\gamma e(n)x_A(n)$$

with n=1, 2, 3, . . . ;
γ=update step;
with initial filter $\hat{h}_{AB}(0)=[0, 0, 0, \ldots 0]$.

The stabilization time of the filter, typically a few tens of seconds, and the update time of the filter, typically of the order of minutes/hours, are obtained as a function of the stationary nature of the signal $s_0(t)$.

The procedure is continuously executed for all the sections of pipeline, so as to obtain the impulse responses of all the single sections, indicated in FIG. 2 with $h_{T0A}(t)$, $h_{AB}(t)$, $h_{BC}(t)$, and/or, in an equivalent manner, the transfer functions $H_{T0A}(f)$, $H_{AB}(f)$, $H_{BC}(f)$, Fourier transforms of said impulse responses.

The measurement stations A and B are positioned at a predetermined distance close to the compression/pumping system $T_0$, in order to allow the discrimination of the direction of propagation of the signals, among those that propagate towards the right and those that propagate towards the left.

In particular, the aforementioned discrimination is efficient if the distance between the measurement stations A and B is greater than half the wavelength of the signals to be analysed.

The Fourier transform of the acoustic signals generated in the system $T_0$ is indicated with $S_0(f)$, whereas the transfer function for the propagation of acoustic signals between A and B is indicated with $H_{AB}(f)$. The latter function is calculated and updated continuously by the acoustic signals $X_A(f)$ and $X_B(f)$ through the adaptive estimation of the mentioned transmission channel.

$S_i(f)$ indicates the Fourier transform relative to an i-th anomalous event 105 generated along the pipeline 104. $H_{iA}(f)$ and $H_{iB}(f)$ represent the transfer function for the acoustic signals between the source point of the i-th anomalous event and the measurement stations A and B, respectively.

Under the hypothesis that possible other sources of acoustic signals are to the right of the measurement station B of FIG. 2, the following equations hold:

$$X_A(f)=S_0(f)+\Sigma H_{iA}(f)S_i(f)=S_0(f)+H_{BA}(f)\Sigma H_{iB}(f)S_i(f)$$

$$X_B(f)=S_0(f)H_{AB}(f)+\Sigma H_{iB}(f)S_i(f)$$

$$H_{AB}(f)=H_{BA}(f)$$

It is possible to obtain the acoustic signal $S_0(f)$ generated by the system $T_0$ with:

$$S_0(f) = \frac{X_A(f) - X_B(f)H_{AB}(f)}{1 - H_{AB}^2(f)}$$

The signals $X_A(f)$ and $X_B(f)$, recorded in the various measurement stations A and B, can be corrected continuously by subtracting the contribution due to the passive source of the system $T_0$, using the signal $S_0(f)$ suitably corrected by the term of acoustic propagation:

$$\hat{X}_A(f)=X_A(f)-S_0(f)H_{S0B}(f)$$

$$\hat{X}_B(f)=X_B(f)-S_0(f)H_{S0A}(f)H_{AB}(f)$$

where the superscript ^ identifies the signal at the measurement station after the removal analysis of the passive signal.

The present invention proposes a joint inversion procedure of the geometric and elastic parameters of the pipeline, fluid-dynamic parameters of the fluid transported, and elastic parameters of the external medium that surrounds the pipe, exploiting the following information:
  experimental measurements of the acoustic transfer functions H(f) of the pipeline sections, comprising the attenuation and propagation speed curves of the vibroacoustic waves, updated continuously;
  experimental measurements of the vibroacoustic signals with continuous analysis;
  mathematical models of the vibroacoustic propagation in pipelines filled with pressurised fluids.

Figure 3:
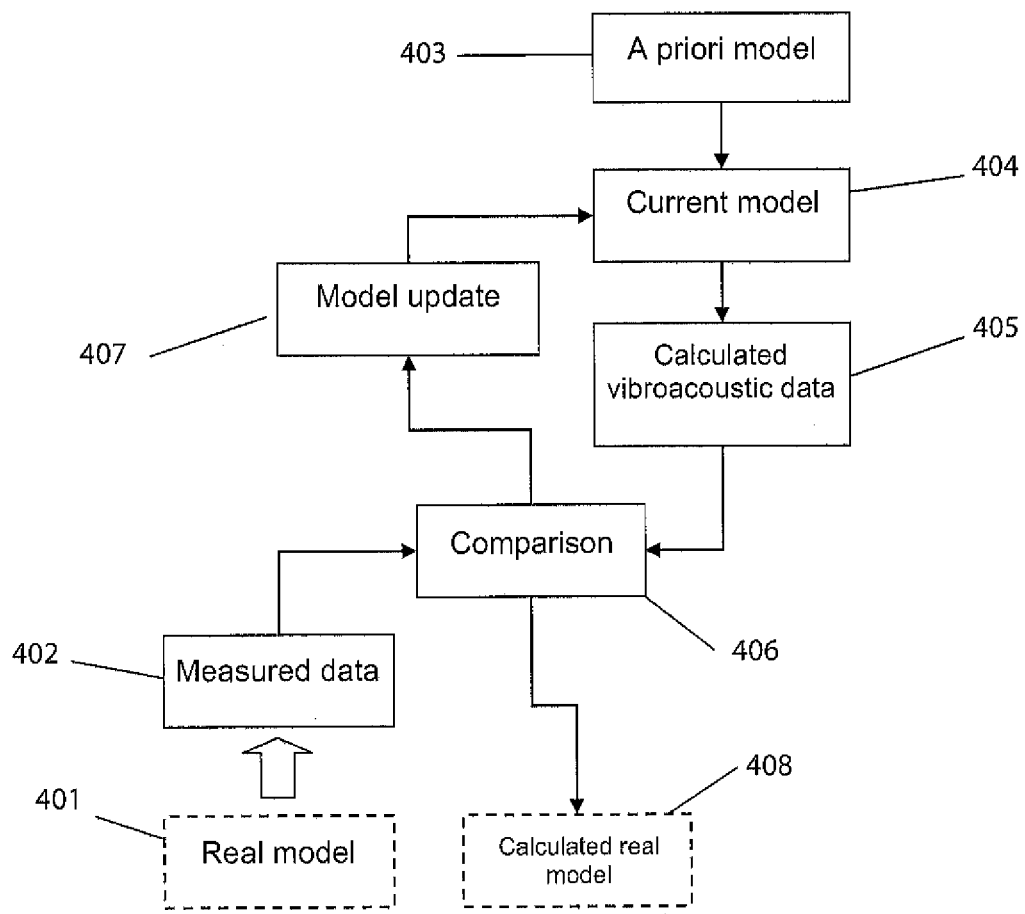
FIG. 3 shows the processing flow diagram of the equivalent model representative of the fluid/pipeline/external medium system according to the present invention.

With reference to FIG. 3, the processing flow diagram of the equivalent model representative of the fluid/pipeline/external medium system is illustrated.

The real model of the pipeline in operation, described by the geometric characteristics, elastic and thermodynamic properties of the fluid/pipeline/external medium system, is unknown and it is represented by the block 401. The data measured (block 402) is the vibroacoustic signal collected in the measurement stations positioned along the pipeline, which are used to experimentally determine the transfer functions relative to the different sections of the pipeline itself. An initial reference mathematical model (block 403) is thus defined by collecting all of the information available a priori, like for example the type of fluid transported, temperatures and pressures of the fluid, the construction materials and the geometric parameters of the pipeline.

Said model available a priori is initially taken as current model (block 404).

Said mathematical model is then used to simulate a set of vibroacoustic measurements in the positions of the real measurement stations (block 405), indicated as synthetic.

The real measurements are therefore compared with the synthetic ones (block 406), and the current model is updated based on the recorded differences (block 407). When the difference between the real measurements and the synthetic ones falls below a predetermined threshold or the number of iterations exceeds a certain predetermined value, the current model becomes the calculated real model (block 408).

As an example, the inversion procedure can be carried out with a probabilistic approach, assigning to the parameters of the current model probability densities that describe its level of uncertainty, and obtaining the corresponding probability density a posteriori of the estimated model as highlighted in the document of Tarantola A. having the title "Inverse Problem Theory" from 2005.

In this way, the parameters about which we have the most information are constrained.

Advantageously, the aforementioned method uses the joint inversion of all of the parameters of the fluid/pipeline/external medium system.

Figure 4:
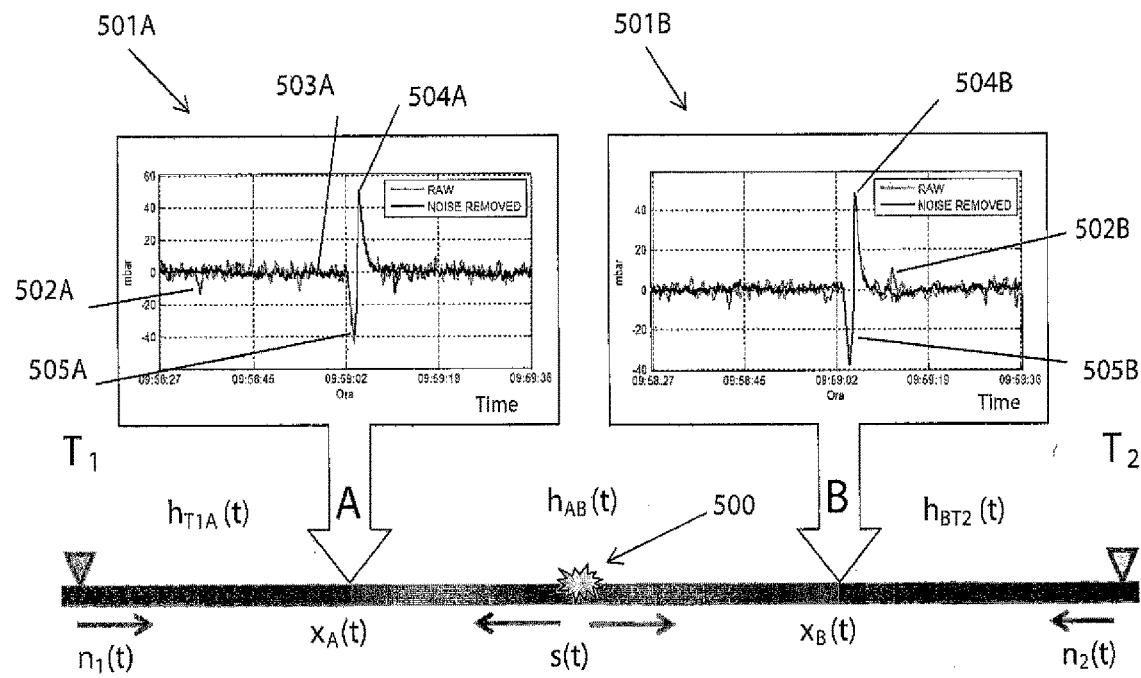
FIG. 4 shows a schematic view of the pipeline in which some measurement stations are installed and in which a generic signal relative to an anomalous event and other noise signals relative to passive sources (T) propagate.

FIG. 4 schematises the general monitoring system for remote detection of an anomalous event 500.

The measurement stations are positioned at $T_1$, $T_2$, A and B.

$T_1$ and $T_2$ are passive sources of acoustic noise, for example pumps/compressor and/or flow-regulation devices and provide respective measurement stations.

The monitoring method according to the present invention comprises the following phases:

continuous processing and updating of the acoustic propagation impulse responses $h_{T1A}(t)$, $h_{AB}(t)$, $h_{BT2}(t)$ in the sections of pipeline between adjacent measurement stations, using the acoustic noises of the noise sources $T_1$, $T_2$ as analysis signals;

estimation of the acoustic noise $n_1(t)$ through the measurements carried out by the pair of measurement stations $T_1$ and A;

estimation of the acoustic noise $n_2(t)$ through the measurements carried out by the pair of measurement stations $T_2$ and B;

removal of the acoustic noises $n_1(t)$ and $n_2(t)$ from the acoustic signals $x_A(t)$, $x_B(t)$ measured by the stations A and B, relative to the anomalous event s(t);

back-propagation, in the section of pipeline between the stations A and B, of the signal $x_A(t)$ measured at A, towards B, and of the signal $x_B(t)$ measured at B, towards A;

cross-correlation of said back-propagated signals, in the section of pipeline between the stations A and B and graphical representation of the envelope;

detection of the anomalous event 500 with threshold criterion of the geographical position and time.

FIG. 4 also represents two graphs 501A, 501B as examples of the signals detected by the stations A and B.

In particular, the graph 501A represents the variation in pressure measured in station A, before (502A) and after (503A) the removal of the acoustic noises generated by the terminals $T_1$ and $T_2$.

As an example, in the graph 501A it is possible to see two anomalous events 504A, 505A, corresponding to the opening and closing of a valve, with spilling of fluid. In the same way, the graph 501B highlights the same anomalous event, but recorded by the measurement station B.

Advantageously, the method according to the present invention allows a continuous experimental estimation of the acoustic transfer functions of the various sections of a pipeline.

Moreover, the multi-channel processing according to the present method allows the removal of acoustic noises. Finally, the back-propagation of the signals with the inversion of the transfer function makes it possible to compensate the effects of attenuation and dispersion of the acoustic propagation.

Figure 5:
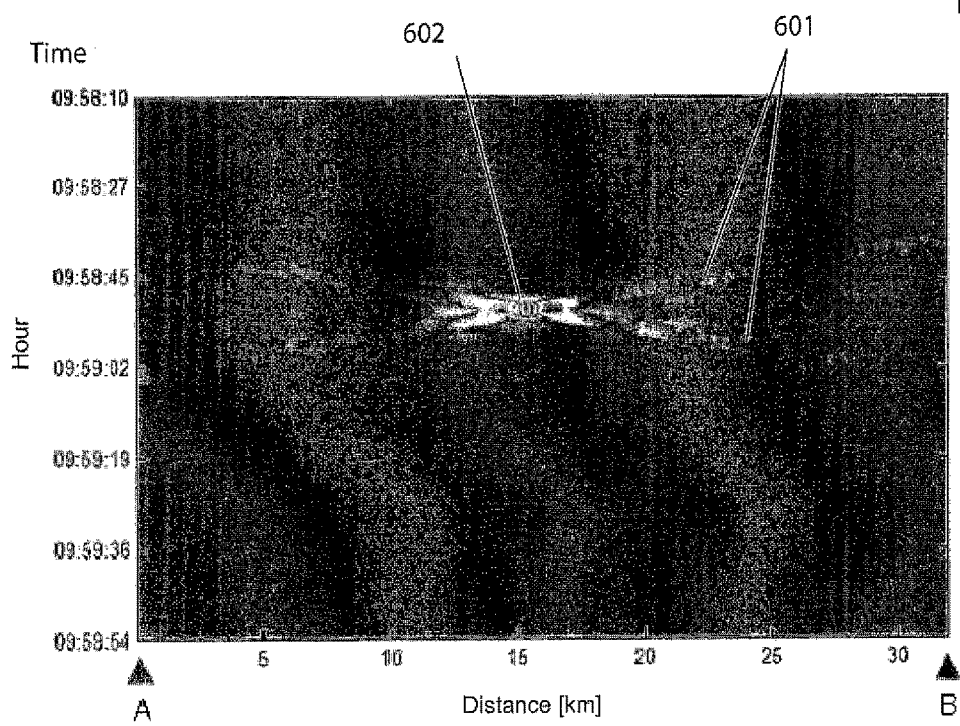
FIG. 5 shows a diagram relative to the remote localisation procedure of an anomalous event recorded by two different measurement stations.

FIG. 5 represents the two signals 601 back-propagated by the stations A and B and the point 602 in which, through cross-correlation, the anomalous event 500 occurred.

EXAMPLE 1

In an oil pipeline in which three types of petroleum are transported, the vibroacoustic measurements are used to estimate the speed of propagation of the acoustic waves $V_0$ in m/s.

Using the relation of Batzle M. and Wang Z., known from the document "Seismic properties of pore fluids" from 1992, it is possible to invert the pressure and/or the density of the fluid and/or the type of petroleum.

Figure 6:
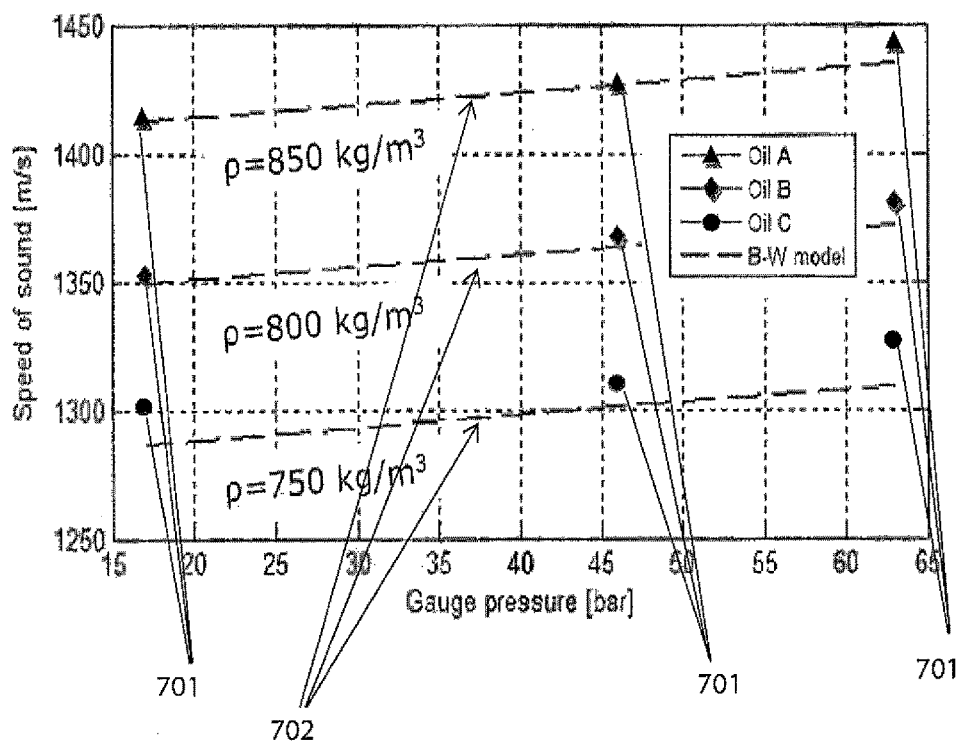
FIG. 6 shows a diagram representing some experimental measurements of speed of sound and pressure, as well as the relative curves obtained with the equivalent model obtained according to the present method.

FIG. 6 represents the results obtained with the model 702 and the relative real measured data 701.

In particular, the model for the speed of sound is:

$$V_0 = 15450 \cdot (77.1 + API)^{-0.5} - 3.7 \cdot T + 4.64 \cdot P + 0.0115 \cdot (0.36 \cdot API^{0.5} - 1) \cdot T \cdot P$$

T: temperature [° C.],
P: pressure [MPa],
API: API gravity

It can be seen that there is a very good matching between the measured data 701 and the values 702 calculated with the present method.

EXAMPLE 2

Known theoretical models were used to obtain the viscosity μ of oil as a function of the temperature T and of the API gravity. Thereafter, from the viscosity μ of the oil, the attenuation α of the acoustic propagation in the fluid was calculated, with the following equations:

first model known from the document "Improved correlations for predicting the viscosity of light crudes" from 1992 by Labedi R.:

$\ln \mu = a_1 + a_2 \ln API + a_3 \ln T$ second model known from the document "Generalized pressure-volume-temperature correlations" from 1980 by Glaso O.:

$\ln \mu = a_1 + a_2 \ln T + a_3 \ln(\ln API) + a_4 \ln T \ln(\ln API)$ third model known from the document model known from the document "Estimating the viscosity of crude oil system" from 1975 by Beggs H. D. and Robinson J. R.:

$\ln(\ln(\mu+1)) = a_1 + a_2 API + a_3 \ln T$

Whereas for calculating the attenuation α the model known from the document "Fundamentals of physical acoustics" from 2000 by Blackstock D. T. was used:

$$\alpha = \frac{1}{a}\sqrt{\frac{\omega\mu}{2\rho V^2}}$$

where:
α: internal radius of the pipe;
ω: angular frequency;
μ: viscosity;
V: speed of sound;
ρ: density of the oil.

Figure 7:
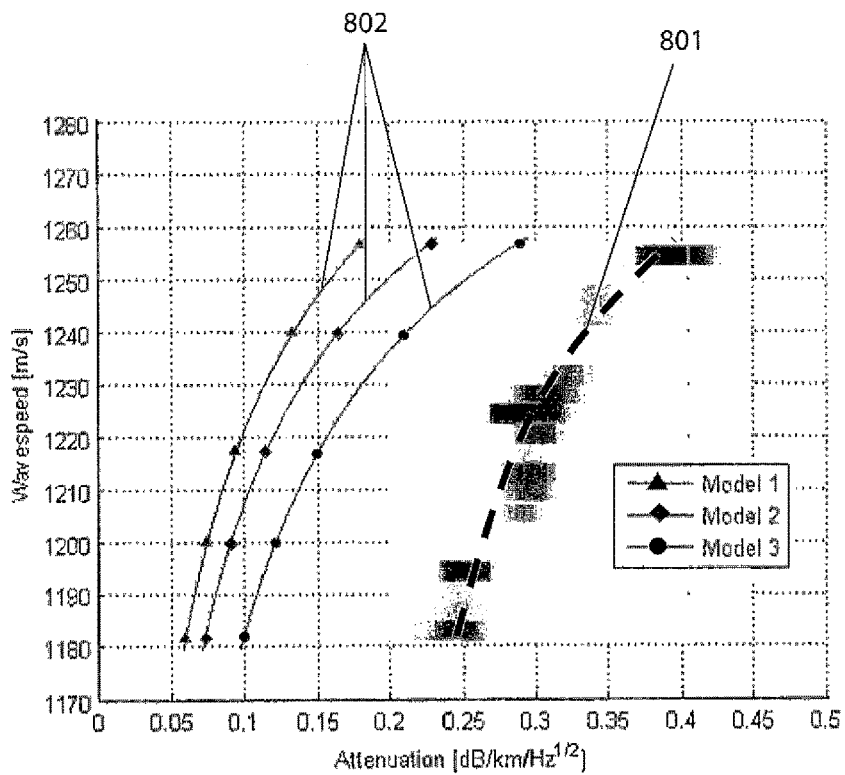
FIG. 7 shows a diagram representing some experimental measurements of attenuation of the acoustic signals, as well as the relative curves obtained with the equivalent model obtained according to the present method.

FIG. 7 illustrates the experimental measurements of attenuation and speed of sound collected over a portion of an oil pipeline having average internal pressure of 63 bar and temperature of T=15° C., during the transportation of different oils with density comprised between 750 kg/m3 and 850 kg/m3. The experimental curve 801 shows a greater attenuation with respect to the theoretical curves 802 obtained with the three aforementioned methods.

In the inversion process, said experimental curve 801 is associated with a reduction in the internal diameter of the pipeline, probably caused by a partial blockage due to deposits of paraffin or asphaltene.

The method for the continuous remote monitoring of the integrity of a pressurized pipeline and of the properties of the fluid of the present invention thus conceived can in any case undergo numerous modifications and variants, all of which are covered by the same inventive concept. The scope of protection of the invention is therefore defined by the attached claims.

The invention claimed is:

1. A method for continuous remote monitoring of integrity of a pressurized pipeline and properties of a transported fluid, wherein the method can be used in long-distance gas pipelines and oil pipelines, comprising:
installing a plurality of measurement stations along the pipeline, connected to vibroacoustic sensors, configured to simultaneously and continuously measure elastic signals propagating in walls of the pipeline, and acoustic signals propagating in the transported fluid;
synchronizing the measured signals, with absolute time reference, measured by the plurality of measurement stations;
continuously transmitting the measured and synchronized signals to a central unit configured to process them in a multichannel mode;
calculating, by the central unit, a plurality of transfer functions that can define vibroacoustic propagation in sections of the pipeline between consecutive measurement stations using, as analysis signals, the measured and synchronized signals and corresponding Fourier transforms;
continuously updating the plurality of transfer functions using acoustic and elastic signals generated by passive sources present along the pipeline;
filtering the elastic signals and the acoustic signals measured by the sensors, subtracting contributions related to the passive sources;
creating an equivalent descriptive model of a system comprising the transported fluid, the pipeline and external medium surrounding the pipeline itself, using the plurality of transfer functions connected with each other,
wherein the filtering includes:
calculating a Fourier transform $S_0(f)$ of a signal $s_0(t)$ generated by a passive source positioned at an end of a section of the pipeline by exploiting direction of arrival and/or signal delay procedures on the signals measured by the sensors connected to each of the plurality of measurement stations installed along the pipeline,
determining the integrity of the pressurized pipeline using the plurality of transfer functions and the calculated Fourier transform,
wherein the Fourier transform $S_0(f)$ of the signal $s_0(t)$ generated by the passive source is obtained with formula:

$$S_0(f) = \frac{X_A(f) - X_B(f) H_{AB}(f)}{1 - H_{AB}^2(f)}$$

wherein $X_A(f)$, $X_B(f)$ are Fourier transforms of respective signals measured by two measurement stations positioned on a same side with respect to the passive source and at a reciprocal distance higher than half a wavelength of a minimum frequency generated by the passive source, and $H_{AB}(f)$ is the transfer function defined for the section of the pipeline between the two measurement stations.

2. The method according to claim 1, further comprising comparing the plurality of transfer functions with each other at time intervals greater than 1 hour to identify changes in geometric characteristics of the pipeline and/or acoustic properties of the transported fluid, or sound speed dispersion and attenuation.

3. The method according to claim 1, wherein the synchronizing the measured signals with the absolute time reference is performed using a global positioning system.

4. The method according to claim 1, wherein the signal $s_0(t)$ is propagated towards each of the plurality of measurement stations by the plurality of transfer functions, subtracting the contributions related to the passive sources from the measured signals, to increase detection sensitivity of anomalous events $S_i(f)$.

5. The method according to claim 1, further comprising using numerical vibroacoustic propagation simulators in the pipeline and inversion procedures for estimating parameters of the system that influence the plurality of transfer functions.

6. The method according to claim 5, further comprising a training for generating known anomalous events $S_i(f)$ programmed on the pipeline or the fluid for constructing an interpretation and recognition system of the anomalous events.

7. The method according to claim 6, further comprising:
comparing variations in amplitude and frequency of the measured signals at programmed time intervals, with respect to a predefined control value to identify the anomalous events $S_i(f)$; back-propagating the measured signals which exceed the predefined control value towards the measurement stations present at ends of the pipeline section by the plurality of transfer functions; applying a cross-correlation function to the back-propagated signals towards each section of the pipeline to localize the anomalous event $S_i(f)$.

8. The method according to claim 7, wherein the comparison, that can identify the anomalous events $S_i(f)$, uses recognition techniques based on a comparison of waveforms and/or threshold criteria measured with waveforms generated during the training.

9. The method according to claim 7, wherein the identification and localization of the anomalous events $S_i(f)$ comprises communication of an alarm and activation of intervention/diagnostic procedures on the pipeline to mitigate environmental impact.

10. The method according to claim 1, wherein, the measuring of the elastic signals and the acoustic signals is performed using sensors comprising: an hydrophone, an geophone and an accelerometer.

11. The method according to claim 1, wherein the passive sources generating acoustic and elastic signals comprise pumps, compressors, and/or flow-regulation devices.

12. A system for continuous remote monitoring of integrity of a pressurized pipeline and properties of a transported fluid comprising a plurality of measurement stations and a central processing unit, each of the plurality of measurement stations positioned along the pipeline and connected to the central processing unit, the system comprising:
- a group of vibroacoustic sensors positioned in contact with the pipeline and transported fluid to measure elastic signals propagating in walls of the pipeline and acoustic signals propagating in the transported fluid;
- each of the plurality of measurement stations including: a local multichannel processing unit configured to acquire, pre-process, and locally save the measured signals, a Global Positioning System device for synchronization in real time with other measurement stations, a conditioning system of the sensors, a power unit, and a data transmission block of radio, microwave, optical fiber, GPRS, or G3 telephone type,
- the central processing unit configured to: calculate a Fourier transform $S_0(f)$ of a signal $s_0(t)$ generated by a passive source positioned at an end of a section of the pipeline by exploiting direction of arrival and/or signal delay procedures on the measured signals, and determine the integrity of the pressurized pipeline using the calculated Fourier transform, wherein the Fourier transform $S_0(f)$ of the signal $s_0(t)$ generated by the passive source is obtained with formula:

$$S_0(f) = \frac{X_A(f) - X_B(f) H_{AB}(f)}{1 - H_{AB}^2(f)}$$

wherein $X_A(f)$, $X_B(f)$ are Fourier transforms of the respective signals measured by two measurement stations positioned on a same side with respect to the passive source and at a reciprocal distance higher than half a wavelength of a minimum frequency generated by the passive source, and $H_{AB}(f)$ is a transfer function defined for the section of the pipeline between the two measurement stations.

* * * * *